United States Patent [19]

Takehana

[11] Patent Number: 4,740,806
[45] Date of Patent: Apr. 26, 1988

[54] RANGE FINDING DEVICE
[75] Inventor: Takamichi Takehana, Nagano, Japan
[73] Assignee: Chinon Kabushiki Kaisha, Nagano, Japan
[21] Appl. No.: 29,948
[22] Filed: Mar. 25, 1987
[30] Foreign Application Priority Data Mar. 26, 1986 [JP] Japan .................................. 61-67459

[51] Int. Cl.$^4$ ........................... G03B 3/00; G01C 3/00
[52] U.S. Cl. .......................................... 354/403; 356/1
[58] Field of Search ....................... 354/403; 356/1, 4; 250/201 AF

[56] References Cited
U.S. PATENT DOCUMENTS

| 3,936,187 | 2/1976 | Momose | 354/403 X |
| 4,470,681 | 9/1984 | Johnson | 354/403 |
| 4,591,257 | 5/1986 | Sawano | 354/403 |

FOREIGN PATENT DOCUMENTS

111405  7/1982  Japan ...................................... 356/1

Primary Examiner—W. B. Perkey
Attorney, Agent, or Firm—Gerald J. Ferguson, Jr.; Michael P. Hoffman; Michael J. Foycik, Jr.

[57] ABSTRACT

A device for finding the range to an object for use in an automatic focusing camera consisting of a light emitting source for emitting light towards the object and a light detecting element for receiving reflected light from the object and producing an output for determining the range to the object. The light detecting element is spaced from the light emitting source by a given base length. The light emitting source consists of a plurality of light emitting elements aligned side-by-side in the horizontal direction orthogonally intersecting the base length.

5 Claims, 11 Drawing Sheets

RANGE FINDING DEVICE

BACKGROUND OF THE INVENTION

1. Field of the Invention

The present invention relates to a range finding device of a triangulation system for use in an automatically focusing camera.

2. Description of the Prior Art

In conventional range finding devices for use in automatically focusing cameras, infrared light is radiated toward an object and the light reflected from the object is received by a photoelectric conversion element to thereby find the range from the camera to the object by means of a triangulation system. In these systems, generally, the infrared light is stopped down or reduced in diameter so as to increase the possible range of the device to a point as far distant as possible. Therefore, the range finding zone in a picture is so narrow that, for example, when two people standing side by side are photographed, if the center of the range finder is directed to an intermediate position between the two people, so that the background appearing behind the two people is focused, erroneous range finding occurs. In order to solve this problem, various means for widening the range finding zone in a picture have been proposed.

For example, U.S. Pat. No. 4,470,681 discloses a system in which respective focusing lenses for an infrared light emitting diode and for a light receiving element are linked with each other so as to be horizontally movable. That is, both the light emitting and light receiving lenses are moved while the same point is focused by the two lenses, so as to scan a surface of an object with infrared light. The aforementioned U.S. Pat. No. 4,470,681 further discloses a technique in which each of the focusing lenses to be used for infrared light emitting diodes and for light receiving elements are made of multiplex eyes (lens arrays) and range finding is performed on a number of points which are equal in number to the number of lens arrays.

Furthermore, Japanese Unexamined Patent Publication No. 193406/1984 discloses a device in which an object is scanned while rotating a light emitting source. A diffraction grating is disposed in front of the light emitting source so as to generate first-order diffraction beams at the opposite sides of a main beam (zero order) to thereby scan the surface of the object by using those three beams.

In the above-mentioned devices in which two focusing lenses are horizontally moved and in which a light emitting source is rotated, respectively, it is possible to perform multi-points range finding by scanning the surface of an object. However, the provision of movable parts causes problems in durability as well as reduction in accuracy.

In the system using lens arrays, there is a troublesome problem in that the axes of the respective lens arrays for the light emitting and receiving elements must coincide with each other. Further, the use of such lens arrays makes the range finding portion bulky, resulting in limitations in the design of the camera.

SUMMARY OF THE INVENTION

An object of the present invention is to provide a multi-points range finding device in which range finding can be performed in a wide zone without using any movable parts, any lens arrays, or the like.

In order to attain the above object according to the present invention, a range finding device is provided in which an object is irradiated with infrared light from a light emitting source and the reflected light from the object is received by a linear semiconductor position detecting element to perform triangulation so as to detect the range, that is, the distance, to the object. Triangulation means consists of the light emitting source and the linear semiconductor position detecting element disposed in the camera body at front upper and lower portions thereof. The light emitting source consists of a plurality of light emitting elements aligned side by side in the horizontal direction orthogonally intersecting the base length of the triangulation means.

The linear semiconductor position detecting element used in the device according to the present invention detects only the variation in the light receiving position in the lengthwise direction (referred to as "y-axis") along the base length and does not detect the variation in the light receiving position in the widthwise direction (referred to as "x-axis") which orthogonally intersects the y-axis. Therefore, the output of the linear semiconductor position detecting element does not change even if the light receiving position changes in the widthwise direction (x-axis) as long as the light receiving position does not change in the lengthwise direction (y-axis).

According to the present invention, the light emitting source consists of the plurality of light emitting elements which are successively energized to emit infrared light to irradiate an object with the infrared light. The light reflected from portions of an object disposed at the same range is focused on the linear semiconductor position detecting element at positions aligned in the widthwise direction (x-axis) in a certain position in the lengthwise direction (y-axis). That is, even if one of the plurality of light emitting elements is energized to irradiate an object, the value of the range detected does not change making it possible to perform accurate range finding as long as the same object is irradiated. Further, even if an object is small, it is possible to achieve range finding by means of the linear semiconductor position detecting element as long as the object is irradiated with the infrared light emitted from any of the light emitting elements. Thus, it is possible to obtain a wider zone of range finding using a plurality of light emitting elements.

DETAILED DESCRIPTION OF THE PREFERRED EMBODIMENTS

Referring to the accompanying drawings, description will be made hereunder as to the preferred embodiments according to the present invention.

FIGS. 1, 2, 3A, and 3B show an embodiment of the range finding device using triangulation means according to the present invention. In the drawings, light emitting lens 11 and light receiving lens 12 are disposed so as to have a base length l maintained therebetween. Light emitting source 13 is disposed in opposition to light emitting lens 11 at a distance $f_1$ therefrom. Light emitting source 13 is provided with a plurality of light emitting elements (n, in number), for example, infrared light emitting diodes $IR_1$, $IR_2$, ..., and $IR_n$, aligned side by side along an x-axis which orthogonally intersects the direction of the base length l. Linear semiconductor position detecting element 14 (hereinafter referred to as "linear PSD 14") is disposed in opposition to light receiving lens 12 at a distance $f_2$ therefrom. Linear PSD 14 has a length which extends along the y-axis along the aforementioned base length l. In the drawings, various optical axes represent irradiating light and reflected light onto and from respective objects 15 positioned at N, M, and F. The reflected light from objects 15 aligned side by side in any position N, M or F is received through light receiving lens 12 on linear PSD 14 at corresponding positions N, M, and F aligned along the x-axis and in a corresponding position along the y-axis. In this case, if the light emitted from the plurality of infrared light emitting diodes $IR_1$, $IR_2$, ..., and $IR_n$ is reflected from a fixed position, for example reflected from objects 15 aligned side by side in the position M, the reflected light is focused on linear PSD 14 at corresponding positions which are aligned side by side widthwise, that is, along the x-axis, in a corresponding fixed position in the y-axis.

The outputs of linear PSD 14 ($\Delta I_1$, $\Delta I_2$ shown in FIGS. 3A, 3B and 4) vary depending on the variation in light receiving positions in the lengthwise direction, that is, along the y-axis, while the outputs do not vary depending on the variation in light receiving positions in the widthwise direction, that is, along the x-axis.

Figure 4:
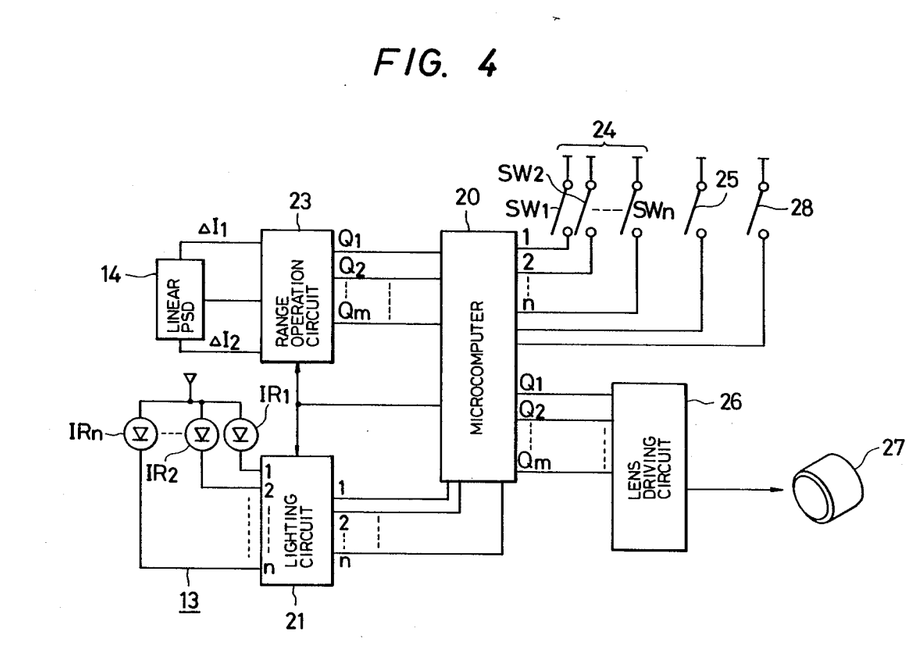
FIG. 4 is a block diagram showing the range-finding control circuit to be used according to the present invention.

FIG. 4 shows a control circuit for the foregoing triangulation means. In the circuit, microcomputer 20 is arranged to control the whole circuit. Lighting circuit 21 is arranged to be responsive to a command from microcomputer 20 to selectively actuate a proper one of the plurality of infrared light emitting diodes $IR_1$, $IR_2$, ..., and $IR_n$ to emit light corresponding to the command. Range operation circuit 23 is arranged to receive the outputs $\Delta I_1$ and $\Delta I_2$ applied from linear PSD 14 to thereby calculate the range to an object by means of a predetermined operation procedure. The result of this calculation is applied to microcomputer 20 in the form of a digital signal having m bits.

Light emitting selection means 24 is provided with switches $SW_1$, $SW_2$, ..., and $SW_n$ corresponding to respective infrared light emitting diodes $IR_1$, $IR_2$, ..., and $IR_n$ which are arranged to apply a selection signal to microcomputer 20 when any one of switches $SW_1$, $SW_2$, ..., and $SW_n$ is turned on. In response to the selection signal, microcomputer 20 causes one of infrared light emitting diodes $IR_1$, $IR_2$ ... and $IR_n$ corresponding to the turned-on switch to be turned on. Further, microcomputer 20 is arranged to cause one of the infrared light emitting diodes located at the center of the group to emit light when all of switches $SW_1$, $SW_2$, ... and $SW_n$ are in their off-states. Range operation instruction switch 25 is arranged to apply a minimum range selection command and an average value operation command to microcomputer 20 when switch 25 is in its on-state and in its off-state, respectively. That is, range operation circuit 23 calculates the range from the object whenever any of infrared light emitting diodes $IR_1$, $IR_2$, ... and $IR_n$ emits light to thereby successively generate digital signals of m bits, and microcomputer 20 stores the respective values of the thus successively produced digital signals.

If the minimum range selection command is applied to microcomputer 20 in response to the on-state of switch 25, microcomputer 20 selects one of the stored values which represents the shortest range. In contrast, if the average value operation command is applied to microcomputer 20 in response to the off-state of switch 25, microcomputer 20 calculates the average value of the above-mentioned stored values. The thus obtained selected value representing the shortest range or average value is applied in the form of a digital signal of m bits to lens driving circuit 26. On the basis of the data of the thus applied digital signal, lens driving circuit 26 drives lens 27 to a focus position. Start instruction switch 28 is arranged to give an instruction to microcomputer 20 when switch 28 is turned on, to cause microcomputer 20 to execute the foregoing various functions thereof.

Figure 5:
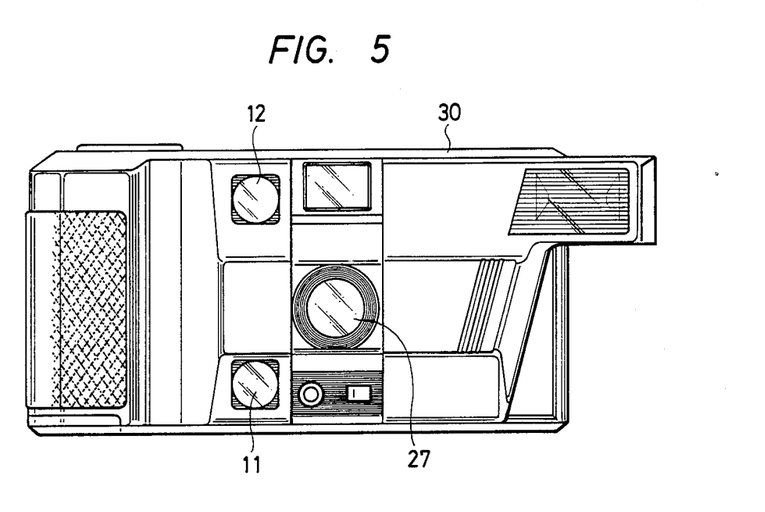
FIG. 5 is a front view of a camera to which the range-finding device according to the present invention can be applied.

FIG. 5 shows an automatically focusing camera in which the above-mentioned triangulation means are combined in camera body 30. In the drawing, light emitting lens 11 and light receiving lens 12 are provided respectively at the lower and the upper portions of camera body 30. The triangulation means, consisting of light emitting source 13 and linear PSD 14 which are disposed in opposition to light emitting lens 11 and light receiving lens 12, respectively, and which are not shown in FIG. 5, is provided at an upper and a lower position on the front of camera body 30. Therefore, the plurality of infrared light emitting diodes $IR_1$, $IR_2$, ... and $IR_n$ constituting light emitting source 13 are aligned side by side in the horizontal direction which orthogonally intersects the base length of the triangulation means.

The operation of the foregoing arrangement will be described hereunder for the situation, by way of example, where a scene which includes two people standing at a comparatively short range and a distant background is to be clearly photographed.

In this situation, first, all of the switches $SW_1$, $SW_2$, . . . and $SW_n$ are turned on so as to be in their on-states. Further, switch 25 is turned on so as to be in its on-state to give the minimum range selection command to microcomputer 20. Switch 25 is turned on because it is necessary for the two people standing at the short range to be clearly focused. Under this condition, if start instruction switch 28 is turned on, lighting circuit 21 causes the plurality of light emitting diodes $IR_1$, $IR_2$, . . . , and $IR_n$ to successively emit light in response to the command from microcomputer 20.

Figure 1:
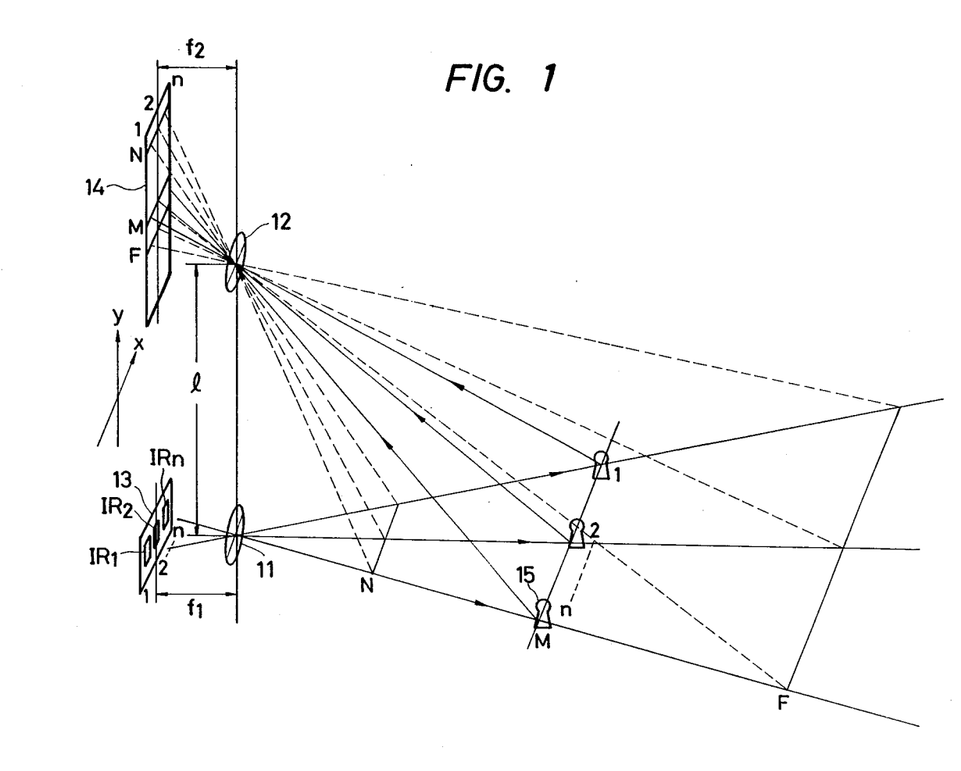
FIG. 1 is a perspective view showing an embodiment of the triangulation means of the range finding device according to the present invention.
Figure 2:
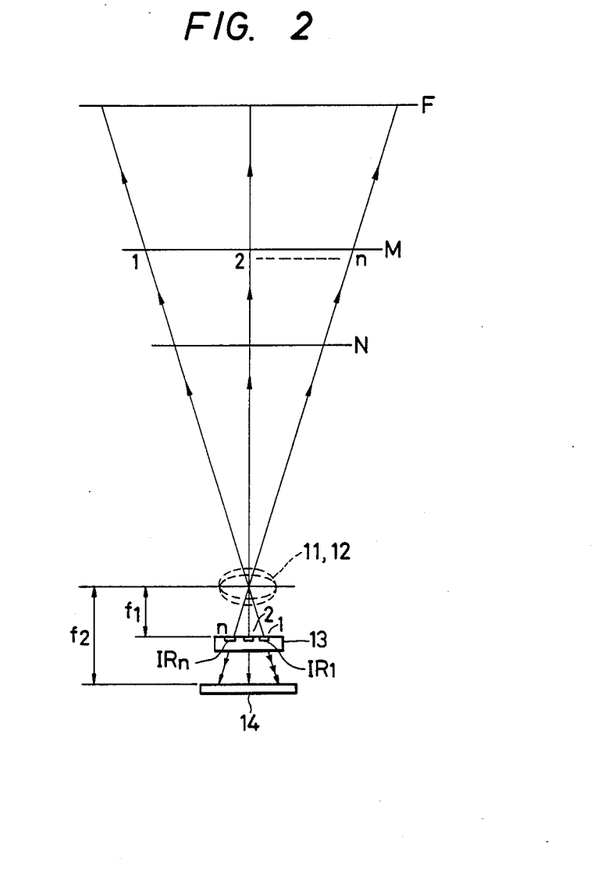
FIG. 2 is a top plan view of the triangulation means of FIG. 1.
Figure 3A:
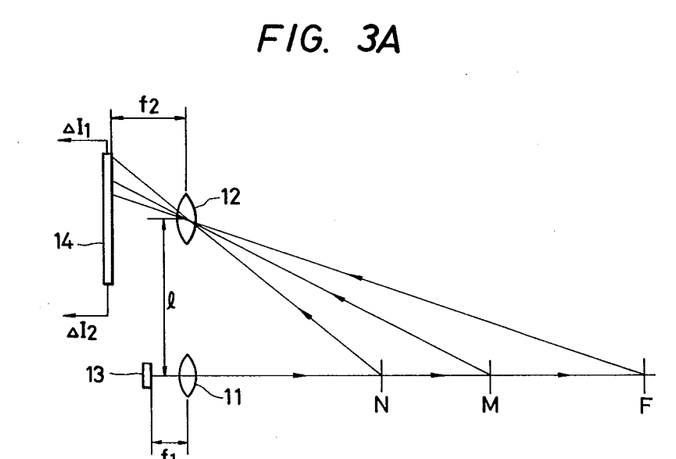
FIG. 3A is a side view of the triangulation means of FIG. 1.
Figure 3B:
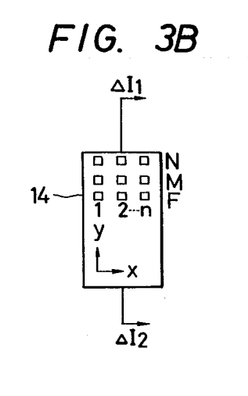
FIG. 3B is a front view of the linear semiconductor position detecting element in FIG. 1.
Figure 6:
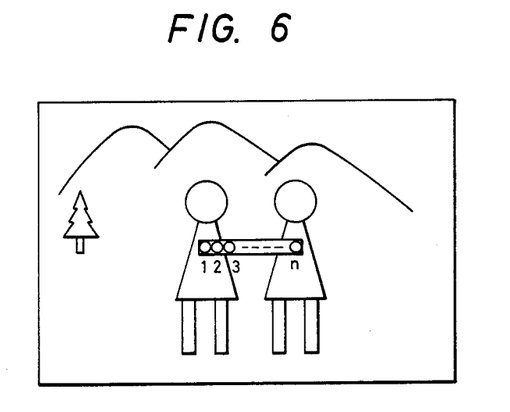
FIG. 6 is a diagram showing the inside of the range finder when range finding is being performed according to the present invention.

First, when the infrared light emitting diode $IR_1$ is energized to emit infrared light, the object is irradiated with the infrared light through light receiving lens 11 in FIG. 1. If, for example, the person on the left side of the picture is irradiated with the infrared light as shown in FIG. 6, the reflected light therefrom is focused on linear PSD 14 through light receiving lens 12 at a predetermined position of linear PSD 14 corresponding to the range from that person, shown in FIG. 1. The outputs $\Delta I_1$ and $\Delta I_2$ are produced corresponding to the focused position. Range operation circuit 23 calculates the range to the object on the basis of the outputs $\Delta I_1$ and $\Delta I_2$, and applies the result of calculation to microcomputer 20 in the form of data having m bits.

Next, the second infrared light emitting diode $IR_2$ is energized to emit infrared light, and when the same person, that is, the person on the left side of the picture, is irradiated with the infrared light as shown in FIG. 6, the focused position on the y-axis of the reflected light on linear PSD 14 does not vary when compared with the position on the y-axis of linear PSD 14 obtained by means of the first infrared light emitting diode $IR_1$, and the same date of m bits as the preceding case is applied to microcomputer 20 from range operation circuit 23.

Next, the third infrared light emitting diode $IR_3$ is energized to emit infrared light, and when the infrared light passes through between the two people as shown in FIG. 6, the range operation circuit produces data of m bits which indicates infinity.

Thus, the above-mentioned operations are repeated until the operation of light emission by the n-th infrared light emitting diode $IR_n$ has been completed. At that time, all the above-mentioned data of m bits have been stored in microcomputer 20. Upon completion of light emission by all of the infrared light emitting diodes, microcomputer 20 selects the shortest value, that is, the data representing the shortest range, that is, the data corresponding to the range to the people shown in FIG. 6 from among all the stored data, and applies the selected data of m bits to lens driving circuit 26. Therefore, lens 27 is driven to the focus position of the people illustrated in FIG. 6. It is a matter of course that there can be a situation in which an average value of all the data is more preferable than the shortest value depending on the state of the object, and for this situation, switch 25 would be maintained in its off-state.

The ON/OFF operation of light emitting selection means 24 may be linked with the focal length of photographing lens 27 so that the range finding zone is made narrower as the focal length becomes longer. In this manner, the range operation can be performed accurately at distant ranges.

Further, without using light emitting selection means 24 of FIG. 4, a program may be set in microcomputer 20 so that the plurality of infrared light emitting diodes are automatically controlled so as to be energized to emit successively in a predetermined order to thereby perform the range-finding operation.

Figure 7:
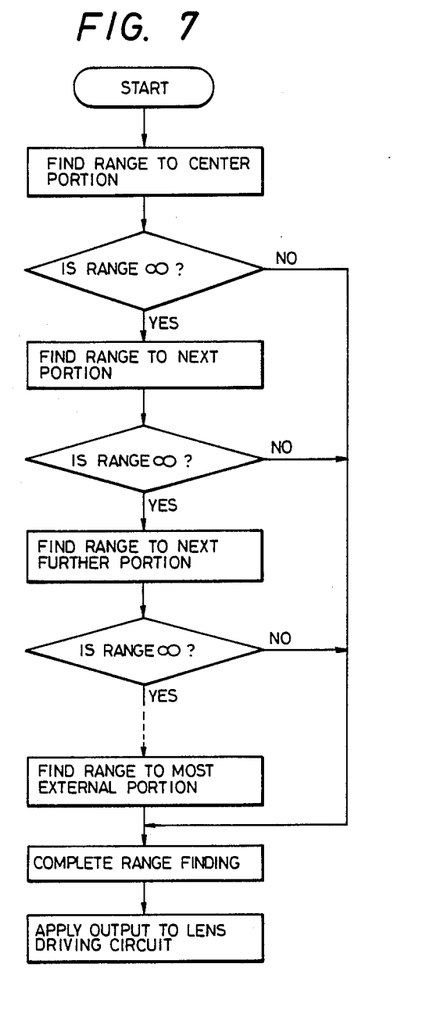
FIG. 7 is a flow chart for explaining the operation of another embodiment according to the present invention.

For example, as shown in FIG. 7, one of the infrared light emitting diodes located at the center portion of a range-finding zone is first energized to emit light to perform range finding, and if the value of detected range is infinite, the range finding zone is gradually increased. That is, the infrared light emitting diodes are energized to emit light in the order of from the center portion thereof towards both ends thereof on mutually right and left. If the value of detected range is infinite to the last light emitting diode energized, lens 27 is driven to the position of infinity. When the value of detected range detected by light emitted from one of the light emitting diodes is not infinite, it is determined that the range between the object and the lens has been completed and the lens is driven on the basis of the value of detected range at that time.

Even in the thus arranged device, in the situation of an object as illustrated in FIG. 6, the background is never focused but the people can be focused properly.

Figure 8:
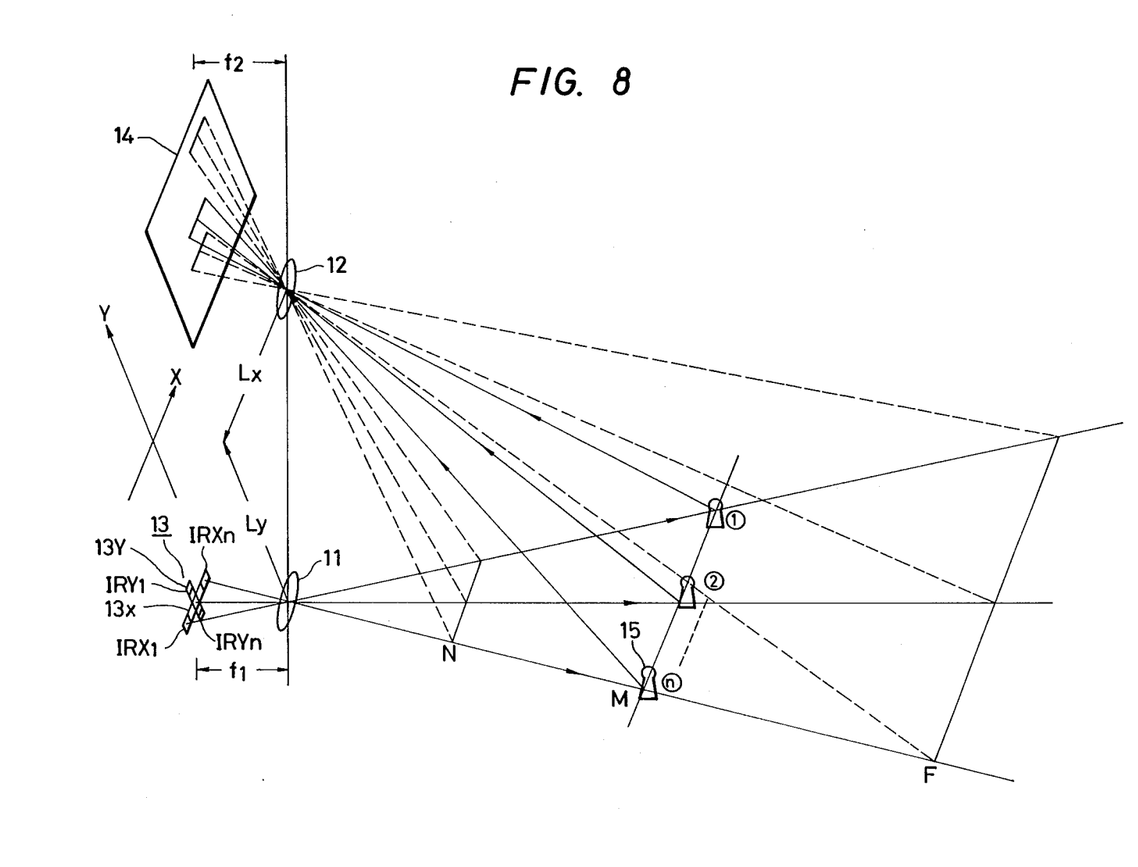
FIG. 8 is a perspective view showing still another embodiment of the triangulation means of the range finding device according to the present invention.
Figure 9:
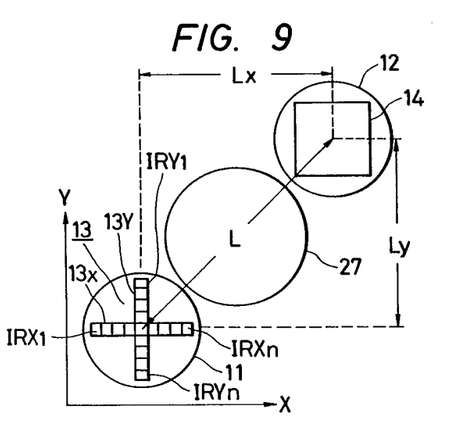
FIG. 9 is a front view of the relationship of the light emitting portion and light receiving portion.
Figure 10:
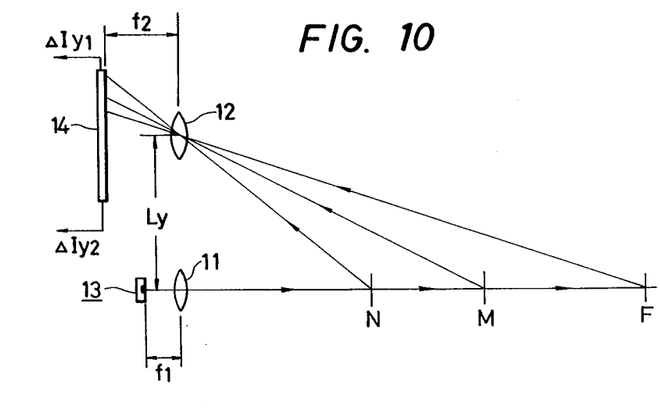
FIG. 10 is a side view of the triangulation means of FIG. 8.

FIGS. 8, 9 and 10 show still another embodiment of the present invention in which a two-dimensional semiconductor position detecting element is used as light detecting means. In the drawings, light emitting lens 11' and light receiving lens 12 are disposed so as to have a base length L maintained therebetween near a photographing lens 27. Light emitting source 13 is disposed in opposition to light emitting lens 11 at a distance $f_1$ therefrom.

Figure 11:
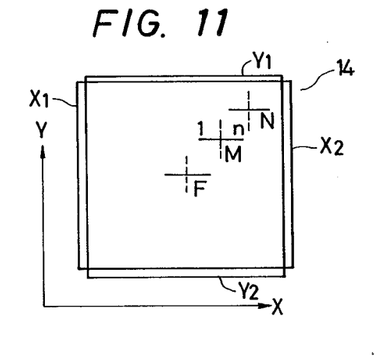
FIG. 11 is a front view showing the relationship of the two-dimensional PSD shown in FIG. 8 and the reflected light to be focused thereon.

In this embodiment, the light emitting source 13 is provided with a X-directional light emitting elements array 13X and a Y-directional light emitting elements array 13Y. The light emitting elements arrays 13X and 13Y are provided with a plurality of light emitting elements, for example, each having infrared light emitting diodes $IR_{x1}$ . . . $IR_{xn}$ aligned side by side along the x-axis and infrared light emitting diodes $IR_{y1}$ . . . $IR_{yn}$ aligned side by side along the y-axis. The arrays 13X and 13Y are so arranged that the directions of the intersecting arrays correspond to the horizontal and vertical directions of a camera body (not shown), respectively. Two-dimensional semiconductor position detecting element 14 (hereinafter referred to as "two-dimensional PSD) is disposed in opposition to light receiving lens 12 at a distance $f_2$ therefrom. The two-dimensional PSD 14 detects the light receiving positions each in the X-direction and the Y-direction intersecting each other. As shown in FIG. 11, electrode terminals $X_1$, $X_2$ and $Y_1$, $Y_2$ are provided at both ends of the two-dimensional PSD 14 along each direction. The center of the two-dimensional PSD 14, as shown in FIG. 9, is disposed so as to have a predetermined base length $L_y$ in the Y-direction with respect to the X-directional light emitting element array 13X, and to have a predetermined base length $L_x$ in the X-direction with respect to the Y-directional light emitting element array 13Y. Accordingly, the length and the angle of the aforementioned base length L are determined by each length of the base lengths $L_x$ and $L_y$. In this embodiment, the base lengths $L_x$ and $L_y$ are set to be equal in length to each other.

In the drawings, various optical axes represent the irradiating light and the reflected light onto and from respective objects 15 positioned at N, M and F due to the X-directional light emitting element array 13X. The reflected light from objects 15 at any position N, M or F is received through light receiving lens 12 on the two-dimensional PSD 14 at the corresponding positions along the Y-direction. In this case, if the light emitted from the plurality of infrared light emitting diodes $IR_{x1} \ldots IR_{xn}$ constituting the X-directional light emitting elements array 13X is reflected from a fixed position, for example reflected from objects 15 aligned side by side in the position M, the reflected light is focused on the two-dimensional PSD 14 at corresponding positions which are aligned side by side along the X-direction in a corresponding fixed position in the Y-direction, as indicated by a solid line in FIG. 11. The outputs of the Y-directional electrode terminals $Y_1$ and $Y_2$ of the two-dimensional PSD 14 ($\Delta I_{y1}$, $\Delta I_{y2}$ shown in FIGS. 10 and 12) vary depending on the variation in light receiving positions in the Y-direction, while the outputs do not vary depending on the variation in light receiving positions in the X-direction.

This is the same as the light emitted from the Y-directional light emitting element array 13Y emits the objects 15. That is, the reflected light from objects 15 due to the light emitted from the Y-directional light emitting element array 13Y is focused on the two-dimensional PSD 14 at corresponding positions aligned side by side along the Y-direction in a corresponding fixed position in the X-direction. The outputs between the X-directional electrode terminals $X_1$, $X_2$ of the two-dimensional PSD 14 ($\Delta I_{x1}$, $\Delta I_{x2}$ shown in FIG. 12) generate depending on the variation in light receiving positions in the X-direction.

Figure 12:
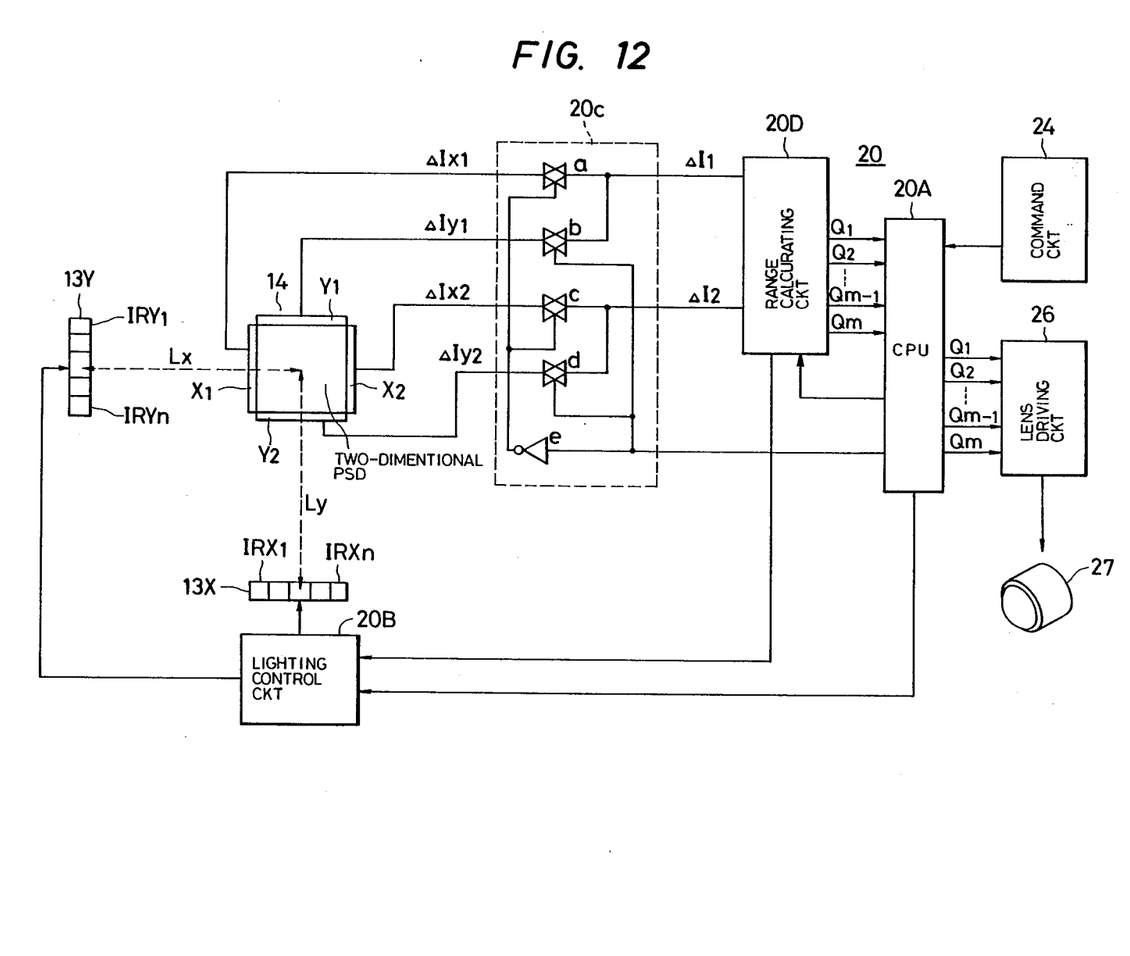
FIG. 12 is a block diagram showing a control circuit to be used according to the present embodiment.

FIG. 12 shows a control circuit for the foregoing triangulation means. In the circuit, a calculating controller 20 comprises a CPU 20A, a lighting control circuit 20B, a switching circuit 20C for inputs and a range calculating circuit 20D. The CPU 20A is arranged to control the whole circuit. The lighting control circuit 20B is arranged to selectively actuate one of the X-directional light emitting element array 13X and the Y-directional light emitting element array 13Y in response to a selection code from the CPU 20A. The lighting control circuit 20B causes the light emitting element array selected by a timing signal synchronous with the range calculating circuit 20D, for example each of the infrared light emitting diodes $IR_{x1} \ldots IR_{xn}$ of the array 13X to successively emit light in response to the command from the CPU 20A.

The switching circuit 20C is so arranged as to select the signals $\Delta IR_{x1}$, $\Delta IR_{x2}$ and $\Delta IR_{y1}$, $\Delta IR_{y2}$ generated at each electrode terminals $X_1$, $X_2$ and $Y_1$, $Y_2$ of the two-dimensional PSD 14 in response to a mode selection signal from the CPU 20A to apply the input signals $\Delta I_1$, $\Delta I_2$ to the range calculting circuit 20D. The switching circuit 20C consists of four analog switches a, b, c and d and an inverter e for controlling the ON/OFF operation thereof. That is, the input terminals of the analog switches a and b are connected to the electrode terminals $X_1$ and $Y_1$, respectively whereas the output terminals thereof are commonly connected to one input terminal of the range calculating circuit 20D. The input terminals of the analog switches c and d are connected to the electrode terminals $X_2$ and $Y_2$, respectively, whereas the output terminals thereof are commonly connected to the other input terminal of the range calculating circuit 20D. The inverter e receives a mode selection signal having a level of H or L from the CPU 20A and generates the inverted signal thereof. That is, if the inverter receives an input signal of a H level, then it generates an output signal of a L level, whereas if the inverter receives an input signal of a L level, then it generates an output signal of a H level. The gate terminals of the analog switches a and c are connected to the output terminal of the inverter e, respectively. The gate terminals of the analog switches b and d are connected to the input terminal of the inverter e, respectively. The analog switches a, b, c and d are turned on when each gate thereof becomes H level. Accordingly, if the CPU 20A generates a mode selection signal of a H level, the analog switches b and d are turned on to apply the signals of $\Delta I_{y1}$ and $\Delta I_{y2}$ as $\Delta I_1$ and $\Delta I_2$ to the range calculation circuit 20D. On the contrary, if the CPU 20A generates a mode selection signal of a L level, the analog switches a and c are turned on to apply the signals of $\Delta I_{x1}$ and $\Delta I_{x2}$ as $\Delta I_1$ and $\Delta I_2$ to the range calculation circuit 20D.

The range calculating circuit 20D detects the light receiving position on the two-dimensional PSD on the basis of the two input values $\Delta I_1$, and $\Delta I_2$, and calculates the range to the object 15 on the basis of the detected light receiving position and a predetermined base length $L_x$ or $L_y$, and applies the result of calculation to the CPU 20A in the form of data having m bits.

The CPU 20A not only generates the foregoing selection code, the mode selection signal, the timing signal and so on, but also temporarily stores the range value which is successively applied thereto from the range calculating circuit 20D to thereby calculate the minimum value, the most frequent value and the average value of the stored range values so that one of their values is applied to a lens driving circuit 26. The lens driving circuit 26 operates a lens 27 in response to the output value from the CPU 20A.

The command circuit 24 commands the CPU 20A to start and to generate the signal indicative of the range widths corresponding to the angle of view of the lens 27, that is, the light emitting width of the light emitting element arrays 13X and 13Y, and to generate the desired one of the minimum value, the most frequent value and the average value of the stored range values.

With the aforementioned construction, first, the CPU 20A starts in response to the start signal from the command circuit 24 to find range along the base length $L_y$ in the vertical direction (Y-direction) of a camera. That is, the X-directional light emitting element array 13X is selected in response to the selection code, and the analog switches b and d are turned on in response to the mode selection code. Under this condition, each of infrared light emitting diodes $IR_{x1} \ldots IR_{xn}$ of the X-directional light emitting element array 13X is caused to emit light in turn to scan the field of view in the horizontal direction. Every time one of the infrared light emitting diode $IR_{x1} \ldots IR_{xn}$ emits light in turn, the range calculation circuit 20D calculates the range to the object to apply the result of calculation to the CPU 20A.

Subsequently, the range finding is carried out along the base length $L_x$ in the horizontal direction (X-direction) of a camera. That is, the Y-directional light emitting element array 13Y is selected in response to the selection code and the analog switches a and c are turned on in response to the mode selection signal. Under this condition, each of the infrared light emitting diodes $IR_{y1} \ldots IR_{yn}$ of the Y-directional light emitting element array 13Y is caused to emit light in turn so that the range calculating circuit 20D calculates the range to the object every time each diode emits light. The range value thus obtained is applied to the CPU 20A one by one.

As described above, after the range finding in the Y-direction and in the X-direction is performed respectively, the CPU 20A calculates the minimum value, the most frequent value, the average value and so on, on the basis of each range value obtained by the aforementioned range finding operation. The lens driving circuit 26 receives a desired one of the minimum value, the most frequent value and the average value on the basis of a command from the command circuit 24 to drive the lens 27 in accordance with the range value thus obtained.

Figure 13:
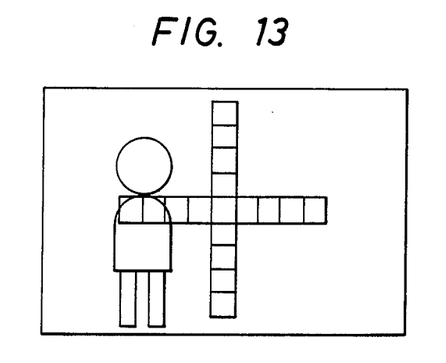
FIGS. 13 and 14 are diagrams showing examples in which the X- and Y-directions are set according to the present invention.
Figure 14:
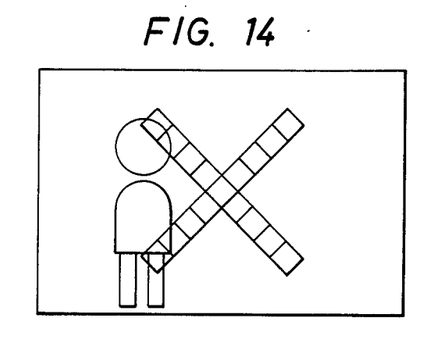

In the above embodiment, the base length $L_x$, $L_y$ are set to be equal in length to each other. However, they may be set to be different in length from each other because the light receiving position to the two-dimensional PSD 14 is proportional to the base length. Further, according to the embodiment, the X-direction and the Y-direction coincide with the horizontal and vertical directions of a camera, respectively, to thereby scan a picture in the form of a cross, as shown in FIG. 13. As shown in FIG. 14, the X- and Y-directions may inclined with an angle of 45° with respect to the horizontal and vertical directions of a camera, respectively, to thereby scan a picture in the form of a X-character.

As described above, in the range finding device according to the present invention, multi-points range finding can be performed without using any movable members nor any compound lenses, thus no erroneous range finding occurs, and excellent durability is obtained. Further, as to the arrangement of the device, the conventional PSD range finding optical systems as well as the output operation circuit thereof can be used as they are, and it is possible to obtain high reliability with no extreme increases in costs.

What is claimed is:

1. A device for finding the range to an object by triangulation, comprising:
   a light emitting source for emitting light towards the object, said light emitting source comprising a plurality of light emitting elements aligned side-by-side along a first direction generally orthogonally intersecting a predetermined base line, wherein ones of said plurality of light emitting elements are selectively operable to emit light; each of said plurality of light emitting elements being arranged to illuminate a different portion of a scene to be photographed;
   a linear semiconductor position detecting means for receiving reflected light from the object to produce an electrical output signal representative of a range to the object from individual ones of said plurality of light emitting elements, each said output signal varying in accordance with a change in position of light reception on said position detecting means along the direction of said base line, said linear semiconductor position detecting means being disposed spaced from said light emitting source by a predetermined length along said base line, wherein said light emitting source and said linear semiconductor position detecting means are disposed in a camera body at upper and lower portions thereof; and
   a range calculating means for receiving each said output signal from said linear semiconductor position detecting means to calculate the range to the object each time said individual ones of said plurality of said light emitting elements emit light.

2. A device as claimed in claim 1, further comprising memory means for storing range values generated from said range calculating means; and command means for applying a command signal to said memory means, whereby said memory means produces a preferred value of said stored range values as a lens driving signal in accordance with said command signal.

3. A device as claimed in, claim 1, further comprising lighting control means for controlling the number of said light emitting elements to emit light corresponding to a focal length of a photographing lens.

4. A device for finding the range to an object by triangulation, comprising:
   light emitting source for emitting light towards said object, said light emitting source comprising a X-directional light emitting element array having a plurality of light emitting elements aligned side-by-side and a Y-directional light emitting element array having a plurality of light emitting elements aligned side-by-side, said X- and Y-directional light emitting element arrays orthogonally intersecting each other;
   a two-dimensional semiconductor position detecting element for receiving reflected light from said object to produce first and second outputs for determining the range to said object, said first outputs varying in accordance with a change in position of light reception thereon in the Y-direction orthogonally intersecting said X-directional light emitting element array and said second outputs varying in accordance with a change in position of light reception thereon in the X-direction orthogonally intersecting said Y-directional light emitting element array, wherein said two-dimensional semiconductor position detecting element is disposed spaced from said light emitting source by a given base length;
   range calculating means for controlling the lighting of said X- and Y-directional light emitting element arrays in order, and for receiving said first outputs from said two-dimensional semiconductor position detecting element when said X-directional light emitting element array emits light and receiving said second outputs from said two-dimensional semiconductor position detecting element when said Y-directional light emitting element array emits light to calculate the range to said object every time said range calculating means receives said respective first and second outputs.

5. A device for finding the range to an object by triangulation, comprising:
   light emitting source for emitting light towards said object, said light emitting source comprising a plurality of light emitting elements aligned side-by-side along a horizontal direction orthogonally intersecting a given base length, wherein said respective light emitting elements emit light in turn;
   a linear semiconductor position detecting element for receiving reflected light from said object to produce outputs for determining the range to said object said outputs varying in accordance with a change in position of light reception thereon along the direction of said base length, said linear semiconductor position detecting element being disposed spaced from said light emitting source by said base length, wherein said light emitting source and said linear semiconductor position detecting element are disposed in a camera body at front upper and lower portions thereof; and range calculating means for receiving the outputs from said linear semiconductor position detecting element to calculate the range to said object every time said respective light emitting elements emit light; and light emitting actuating means for actuating said respective light emitting elements in the order of from the center portion thereof towards both ends thereof on right and left, wherein when the range value detected by light emitted from one of said light emitting elements in infinite, then said light emitting actuating means actuates the next light emitting element.

* * * * *